(12) United States Patent
Henderson

(10) Patent No.: US 7,926,425 B2
(45) Date of Patent: Apr. 19, 2011

(54) TRAM STEERING SYSTEM

(76) Inventor: Joy Kirston Henderson, Fort Worth, TX (US)

( * ) Notice: Subject to any disclaimer, the term of this patent is extended or adjusted under 35 U.S.C. 154(b) by 1147 days.

(21) Appl. No.: 11/604,586

(22) Filed: Nov. 27, 2006

(65) Prior Publication Data

US 2007/0119332 A1    May 31, 2007

Related U.S. Application Data

(60) Provisional application No. 60/740,025, filed on Nov. 28, 2005.

(51) Int. Cl.
B61B 12/04 (2006.01)

(52) U.S. Cl. ............ 104/124; 104/304; 105/3; 105/167; 105/168; 180/168; 180/167

(58) Field of Classification Search .............. 105/3, 167, 105/168; 104/124, 304; 180/167, 168, 443, 180/444; 280/419, 442
See application file for complete search history.

(56) References Cited

U.S. PATENT DOCUMENTS

| | | | |
|---|---|---|---|
| 5,845,581 A * | 12/1998 | Svensson | 104/120 |
| 6,039,135 A | 3/2000 | Henderson | |
| 6,357,358 B2 * | 3/2002 | Henderson | 104/281 |
| 6,401,625 B1 | 6/2002 | Henderson | |
| 6,435,100 B1 | 8/2002 | Henderson | |
| 6,615,740 B2 * | 9/2003 | Henderson | 104/88.03 |
| 6,742,458 B2 * | 6/2004 | Henderson | 104/242 |
| 6,834,595 B1 * | 12/2004 | Henderson | 104/88.01 |
| 6,837,167 B2 * | 1/2005 | Henderson | 104/124 |
| 7,302,319 B2 * | 11/2007 | Wu | 701/19 |
| 2001/0035107 A1 * | 11/2001 | Henderson | 104/281 |
| 2002/0000357 A1 * | 1/2002 | Henderson | 193/35 R |
| 2002/0073877 A1 * | 6/2002 | Henderson | 104/281 |
| 2002/0148380 A1 * | 10/2002 | Henderson | 104/242 |
| 2002/0189489 A1 * | 12/2002 | Henderson | 104/242 |
| 2004/0089189 A1 * | 5/2004 | Henderson | 104/118 |
| 2006/0278120 A1 * | 12/2006 | Campbell et al. | 104/88.01 |
| 2007/0119332 A1 * | 5/2007 | Henderson | 104/307 |
| 2007/0146165 A1 * | 6/2007 | Tanaka | 340/932.2 |
| 2007/0146166 A1 * | 6/2007 | Sato et al. | 340/932.2 |
| 2010/0114434 A1 * | 5/2010 | Kawabata et al. | 701/41 |
| 2010/0235053 A1 * | 9/2010 | Iwakiri et al. | 701/42 |
| 2010/0259420 A1 * | 10/2010 | Von Reyher et al. | 340/932.2 |
| 2010/0289634 A1 * | 11/2010 | Ikeda et al. | 340/441 |

* cited by examiner

Primary Examiner — S. Joseph Morano
Assistant Examiner — Jason C Smith
(74) Attorney, Agent, or Firm — Bracewell & Giuliani LLP

(57) ABSTRACT

A tram has a lead vehicle and one or more trailing vehicles coupled to it. Each vehicle has sets of front and rear wheels, both sets being steerable independently of the other. A manual controller provides signals to a processor in the lead vehicle, which in turn steers the front and rear wheels along a desired path. A processor on the first trailing vehicle controls front and rear servos to steer its wheels according to the path of the rear wheels of the leading vehicle. The second trailing vehicle has a processor that steers its front and rear wheels according to information provided by the first leading vehicle. Steering sensors on the vehicles sense distance to a steering rail while the vehicles are on a guideway and provide signals to the processors for automatic steering. While on a guideway, the tram uses power collectors to transfer power from the guideway.

16 Claims, 8 Drawing Sheets

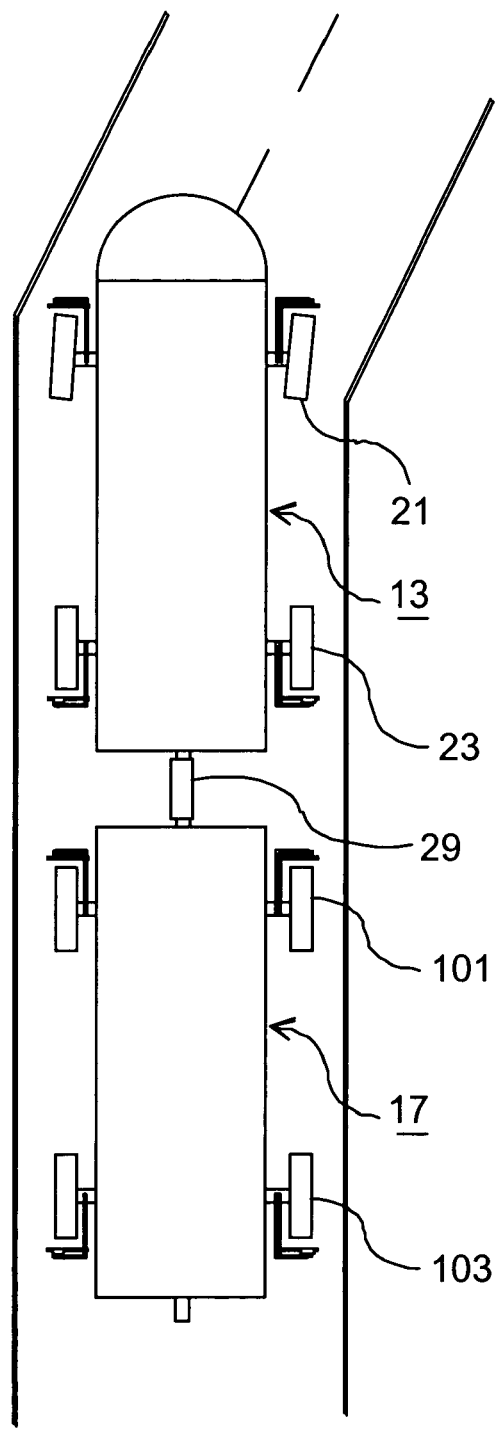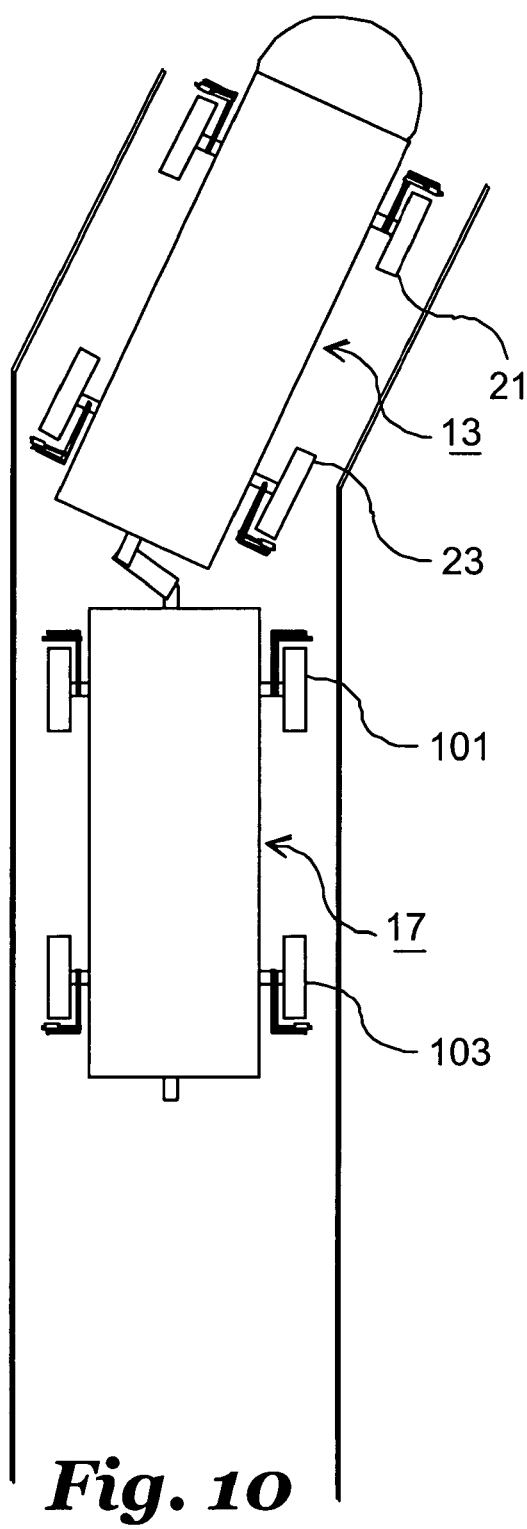

TRAM STEERING SYSTEM

CROSS-REFERENCE TO RELATED APPLICATION

This application claims priority to provisional application Ser. No. 60/740,025, filed Nov. 28, 2005.

FIELD OF THE INVENTION

This invention relates in general to trams containing multiple vehicles coupled together that are operable in conventional roadways and preferably also on elevated guideways.

BACKGROUND OF THE INVENTION

In the field of mass transport, trams that run on guideways are known, particularly at airports for conveying passengers from one terminal to another. Typically, the guideway has a steering rail and power conductors. Normally each tram unit has front and rear wheels, and at least the lead unit has an electrical motor for supplying power to the wheels. The tram receives its power and steering control from the guideway system. These guideway passenger trams are not equipped to be driven by an operator on a conventional roadway.

Operator driven, manually steerable trams have also been used in the past for conveying people, such as from large parking areas to an arena, or conveying people around a fair, a zoo, or a theme park. These trams comprise a tractor or lead vehicle that has its onboard power source, typically a gasoline or diesel engine. The trailing units are connected by hitches to each other and towed by the lead vehicle. These trams are not suitable for automatic operation on a guideway. Also because of the wide turn radius, they are not normally driven on a conventional street.

Cargo transport systems that include tractors that tow two or more trailers on conventional roadways are known. The tractor or truck supplies the power, and an operator controls the steering, speed and brakes. Often the first trailer is connected to the tractor by a fifth wheel arrangement, thus will have only a rear set of wheels. The second trailer usually has both front and rear sets of wheels. These cargo transport units are not capable of automatic operation on a guideway system. Furthermore, it is difficult to operate a truck with tandem trailers on city streets because of the wide radius of turn that would be required.

SUMMARY OF THE INVENTION

The transport system of this invention has a guideway having a power conductor rail and a steering rail. At least one vehicle having front and rear wheels for moving the vehicle along the guideway. The vehicle has a front steering servo for the front wheels of the vehicle, preferably a rear steering servo for the rear wheels, and a processor. The vehicle has a steering rail sensor mounted to the vehicle for sensing a distance from the sensor to the steering rail of the guideway, and for providing signals in response thereto to the processor. The processor provides signals to the steering servos to steer the vehicle to maintain a selected distance between the sensor and the steering rail of the guideway. Preferably, the vehicle has a manual steering controller that provides signals to the front steering servo to enable an operator to steer the vehicle on conventional roads.

In the preferred embodiment, the vehicle is part of a tram having a lead vehicle and at least one trailing vehicle coupled to the lead vehicle. Each vehicle has front and rear wheels, a front servo for steering the front wheels, and a rear servo for steering the rear wheels. Each vehicle has a processor that provides signals to the front and rear servos. The lead vehicle has a manual steering controller. Any or all of the vehicles of the tram may have an onboard power source, such as an engine driven generator. Preferably, the coupling between each vehicle has a central rigid link with ball sockets on each end for securing to ball hitches on the vehicles.

While driven on conventional roadways, an operator steers the tram by moving a manual steering controller. The manual steering controller provides a signal to the processor, which provides a signal to the front servo of the lead vehicle to turn along a selected path. The processor of the lead vehicle also provides signals to the rear servo of the lead vehicle to cause the rear wheels to turn along the same selected path. Preferably the processor stores the steering signals provided to the front wheel servo. A speed sensor provides vehicle speed information to the processor, and the processor computes how much time will be required before the rear wheels reach the same point on the ground surface that the first front wheels were when a particular steering command was given. The processor then causes the rear wheels to turn on the ground surface at the same place and angle as where the front wheels turned.

The processor of the lead vehicle provides a signal to the processor of the first trailing vehicle indicative of the steering history of the rear wheels of the lead vehicle. The processor of the first trailing vehicles computes the amount of time required before the front wheels of the first trailing vehicle reach the point on the ground surface at which the rear wheels of the lead vehicle turned. The processor of the first trailing vehicle provides signals to its front wheel servo to make the turn at the appropriate point, thus maintaining the wheels along a continuous path. The processor of the first trailing vehicle records the steering history of its front wheels and provides that information to its rear wheel servo to cause the rear wheels to steer along the same selected path. A number of other trailing vehicles may also be coupled to each other and steered in the same manner.

The tram is preferably also operable without a driver on guideways that have a steering rail and electrical power conductors. Preferably each of the vehicles has at least one steering sensor that is a maintained a selected distance from the guideway steering rail while the vehicle is on the guideway. The steering sensor provides information to the processor, which in turn steers the front and rear wheels to maintain the vehicle at the desired distance away from the steering rail. A switch controlled by an operator switches from the manual steering mode to the automatic guideway steering mode.

Additionally, when on a guideway, the electrical power to operate the vehicle and electric motors for driving the wheels is provided by guideway electrical conductor rails. The lead or one of the other vehicles has at least one electrical collector that contacts the guideway power conductor rails to supply power. An operator controls a switch from an onboard power source to the guideway power source when this occurs.

BRIEF DESCRIPTION OF THE DRAWINGS

FIG. 9 is a schematic view of the lead vehicle and first trailing vehicle of FIG. 1 shown beginning a turn.

FIG. 10, is a schematic view of the lead vehicle and first trailing vehicle of FIG. 9, shown during the process of the turn.

DETAILED DESCRIPTION OF THE INVENTION

Figure 1:
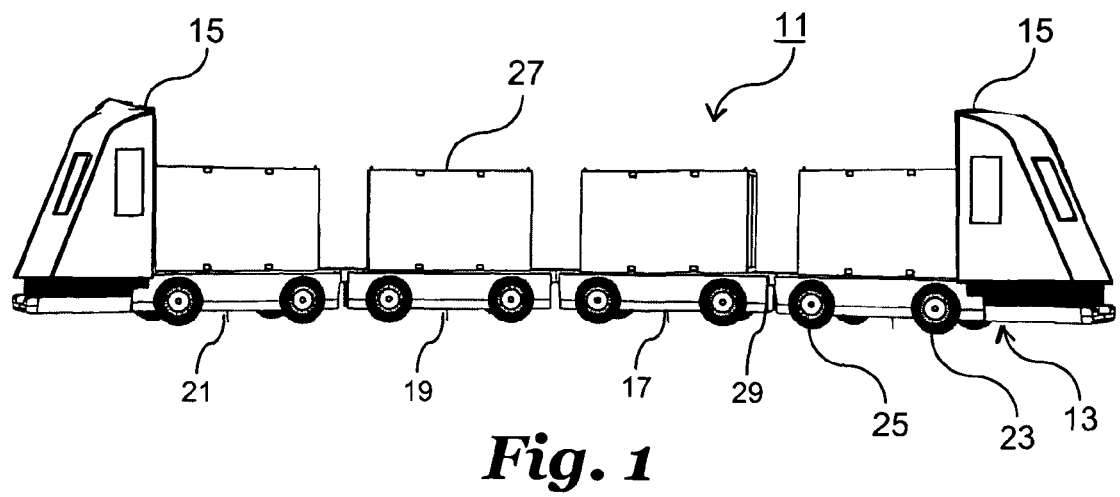
FIG. 1 is a side elevational view illustrating a tram constructed in accordance with this invention and appearing as if on conventional roadways or streets.

Referring to FIG. 1, tram 11 includes a lead vehicle 13 that has a controls cab 15. A first trailing vehicle 17 is connected to the lead vehicle 13. A second trailing vehicle 19 is connected to first trailing vehicle 17. Additional trailing vehicles may be connected into tram 11. In the example of FIG. 1, an end vehicle 21 is shown connected to second trailing vehicle 19. End vehicle 21 may also have a controls cab 15 for controlling tram 11 when it is driven in the reverse direction from that shown in FIG. 1. Alternately, end vehicle 21 could be a trailing vehicle similar to first and second trailing vehicles 17, 19.

Figure 4:
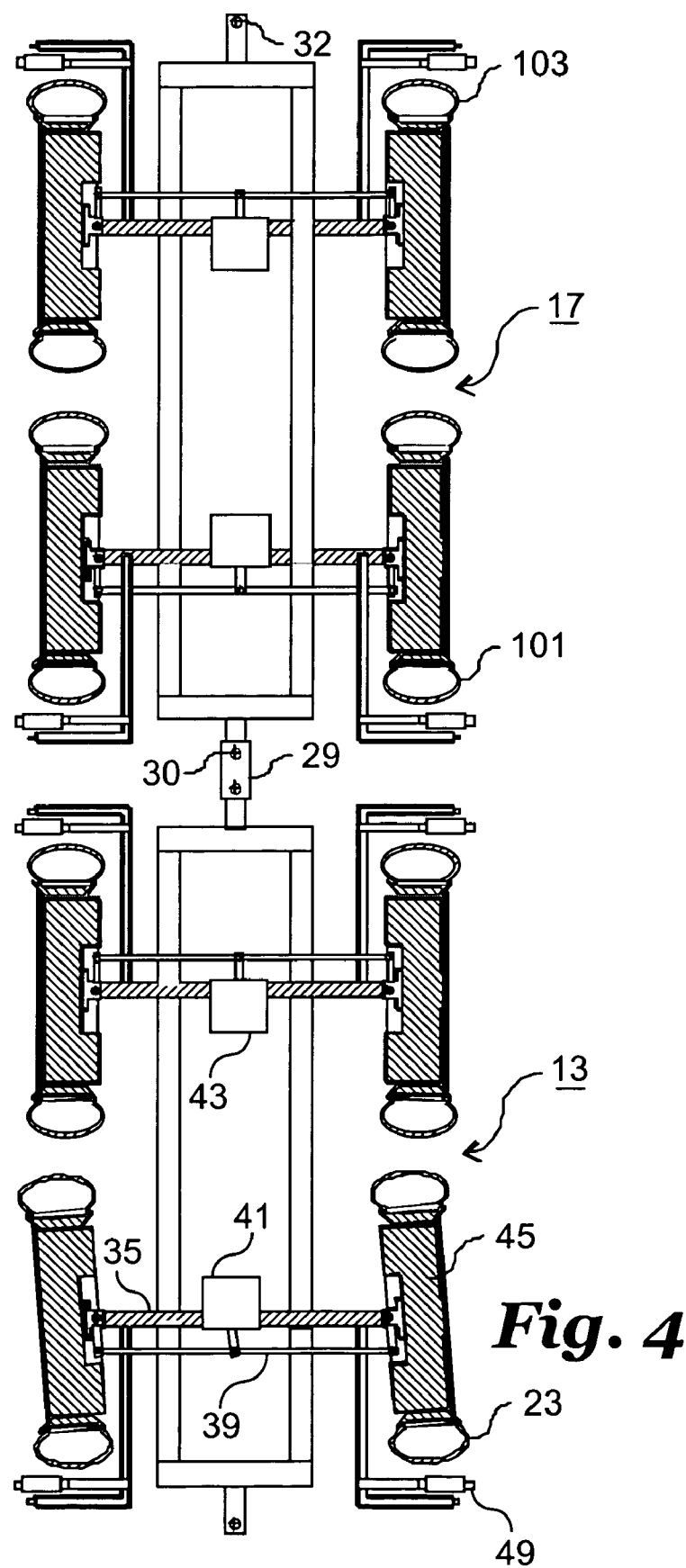
FIG. 4 is a reduced scale sectional view of the lead vehicle similar to FIG. 3, but also showing one of the trailing vehicles of the tram of FIG. 1.

Lead vehicle 13 has front and rear rubber-tire wheels 23, 25, as do the other vehicles 17, 19 and 21. In the example shown in FIG. 1, removable cargo containers 27 are mounted on each vehicle 13, 17, 19 and 21. Alternately, passenger compartments could be mounted to one or all of vehicles 13, 17, 19 and 21. Coupling links 29 connect vehicles 13, 17, 19 and 21 to each other, as illustrated in FIG. 4. Each coupling link 29 is preferably a solid rigid member, preferably with ball sockets 30. Each ball socket 30 is a conventional trailer hitch ball socket for connection to a conventional trailer hitch ball on each vehicle 13, 17. Coupling link 29 and ball sockets 30 enable the ends of vehicles 13, 17 to rotate in any direction in relationship to each other as may be required by changes in ground or guideway level. Coupling link 29 and ball sockets 30 further enable the ends of vehicles 13, 17 to shift laterally as may be required to maintain the paths of the wheels on cars 13, 17 the same on either the ground or the guideway. Lateral shifting of vehicles 13, 17 cause the coupling link 29 position depicted in FIG. 10. As an alternative, each end of coupling link 29 could have a ball and each vehicle have a ball socket.

Figure 2:
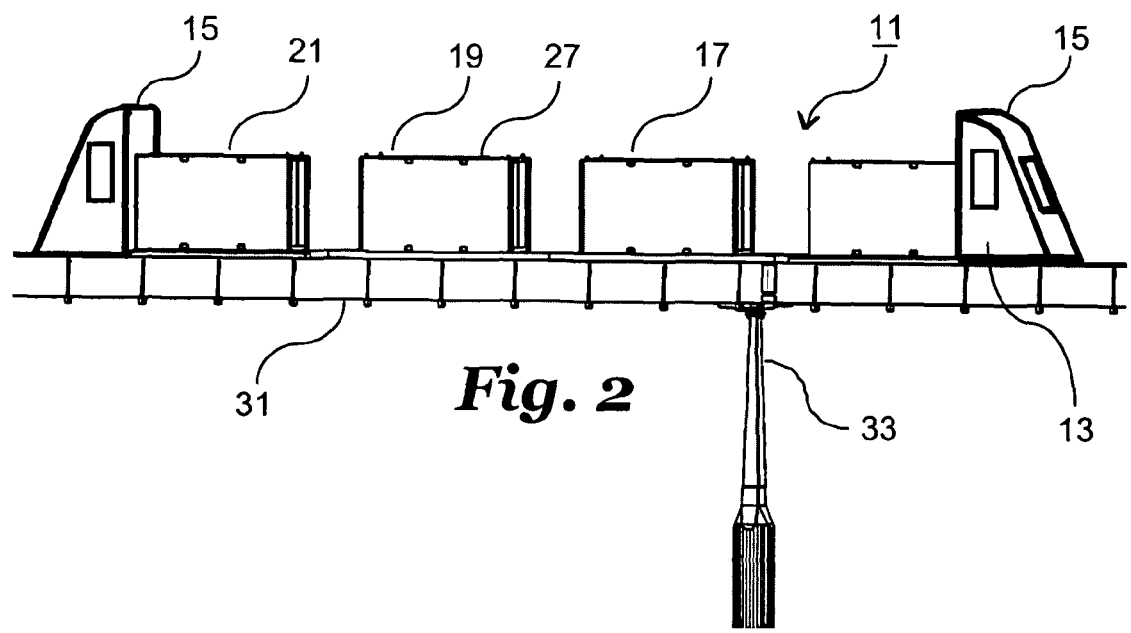
FIG. 2 is a side elevational view of the tram of FIG. 1, shown on a guideway.

In FIG. 2, tram 11 is shown located on a guideway 31, which may be of a variety of designs. Guideway 31 enables conventional wheels having rubber tires to operate thereon, rather than rails such as would be used by a train. Guideway 31 is shown in FIG. 2 to be elevated by guide posts 33. Guideway 31 is equipped to control the operation of tram 11 without a driver.

Figure 3:
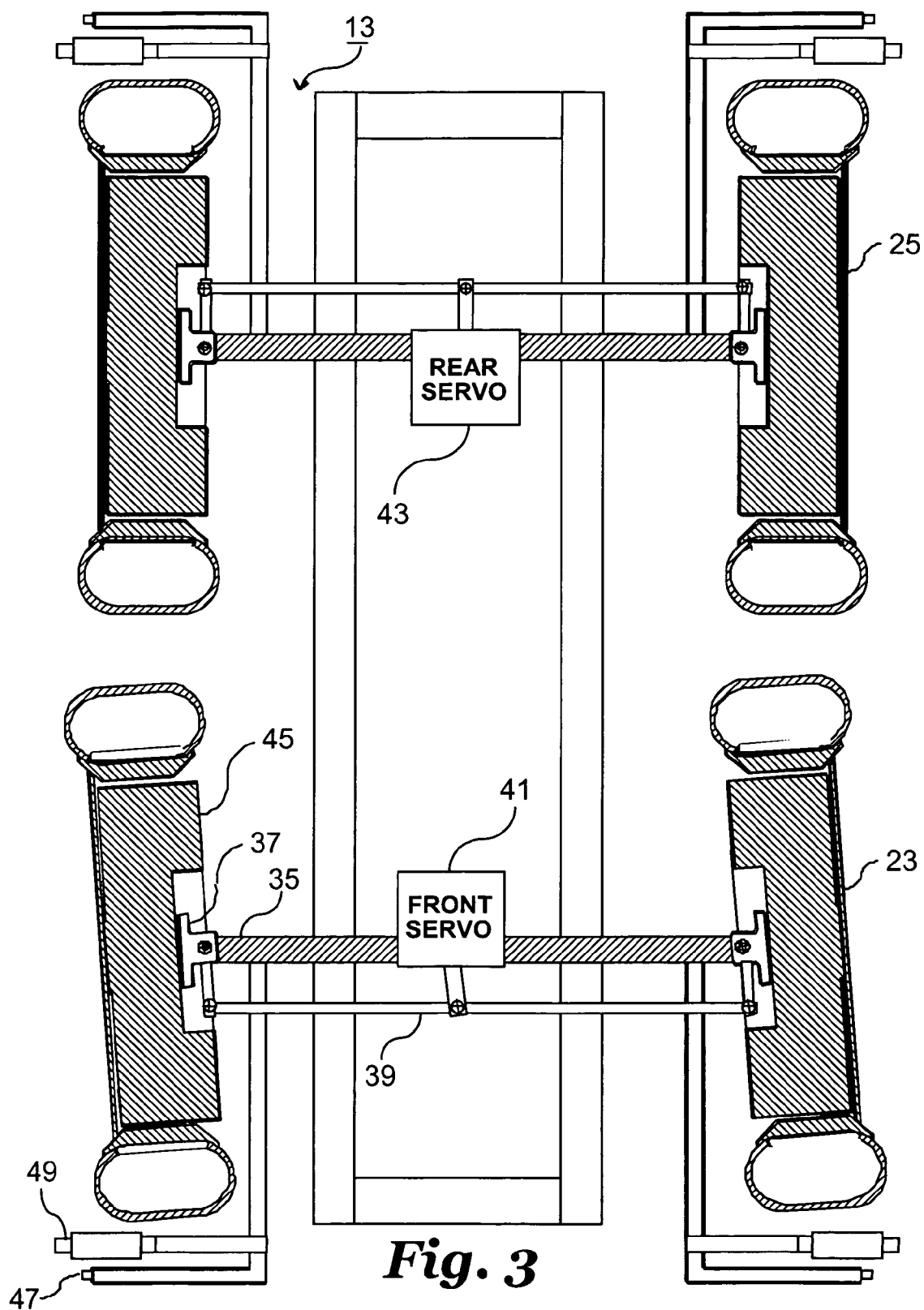
FIG. 3 is a schematic sectional view illustrating a portion of the lead vehicle of the tram of FIG. 1.

Lead vehicle 13 is shown schematically in FIG. 3, but in the preferred embodiment, FIG. 3 would also represent trailing vehicles 17, 19 or end vehicle 21 (FIG. 1). Lead vehicle 13 has axles 35 that are supported on front wheels 23 and rear wheels 25. In the preferred embodiment, front wheels 23 are steerable in unison with each other, and rear wheels 25 are steerable in unison with each other but independent of front wheels 23. Each of the wheels 23, 25 has a steering clevis 37. A tie rod 39 connects the steering devises 37 between front wheels 23. Similarly, a tie rod 39 connects steering devises 37 between rear wheels 25.

A front servo 41 comprising an electromechanical or electro-hydraulic actuator is mounted to axle 35 and is connected to the front tie rod 39 for moving it in right and left directions. Similarly, a rear servo 43 is connected to the rear tie rod 39 for steering rear wheels 25. Preferably each front wheel 23 and rear wheel 25 is independently driven by a separate electrical motor 45 (FIG. 3). Each electrical motor 45 mounts to the inside of the hub of each wheel 23, 25.

Referring to FIG. 3, lead vehicle 13 is steered automatically while operating on guideway 31 (FIG. 2). The steering is handled by one or more steering sensors 47. In the example shown, four steering sensors 47 are employed, each being mounted adjacent one of the wheels 23 and 25. Each steering sensor 47 is rigidly mounted to one of the vehicle axles 35 and extends laterally outward. Steering sensors 47 for front wheels 23 are located forward of front wheels 23, and steering sensors 47 for rear wheels 25 are located rearward of rear wheels 25. As shown in FIG. 4, all of the trailing vehicles 15, 17, 19 and 21 (not all shown) preferably have similar steering sensors 47 for automatic steering while on guideway 31.

Lead vehicle 13 and/or one of the trailing vehicles 15, 17, 19 or 21 also has at least one power collector 49 that may be the same for trailing vehicles, as shown in FIG. 4, for transferring electrical power to vehicle 13 while driving on guideway 31 (FIG. 2). In the preferred embodiment, there are four power collectors 49, each mounted to axles 35 and extending laterally alongside one of the steering sensors 47. In the embodiment shown, two of the power collectors 49 are located forward of front wheels 23 and two are located rearward of rear wheels 25. FIG. 4 shows power collectors 49 on each trailing vehicle, but it is possible that none or only one of the trailing vehicles 15, 17, 19 and 21 would have a power collector 49. It is possible that lead vehicle 13 would not have a power collector 49, and only one or more of the trailing vehicles 15, 17, 19 and 21 have power collectors 49.

Figure 5:
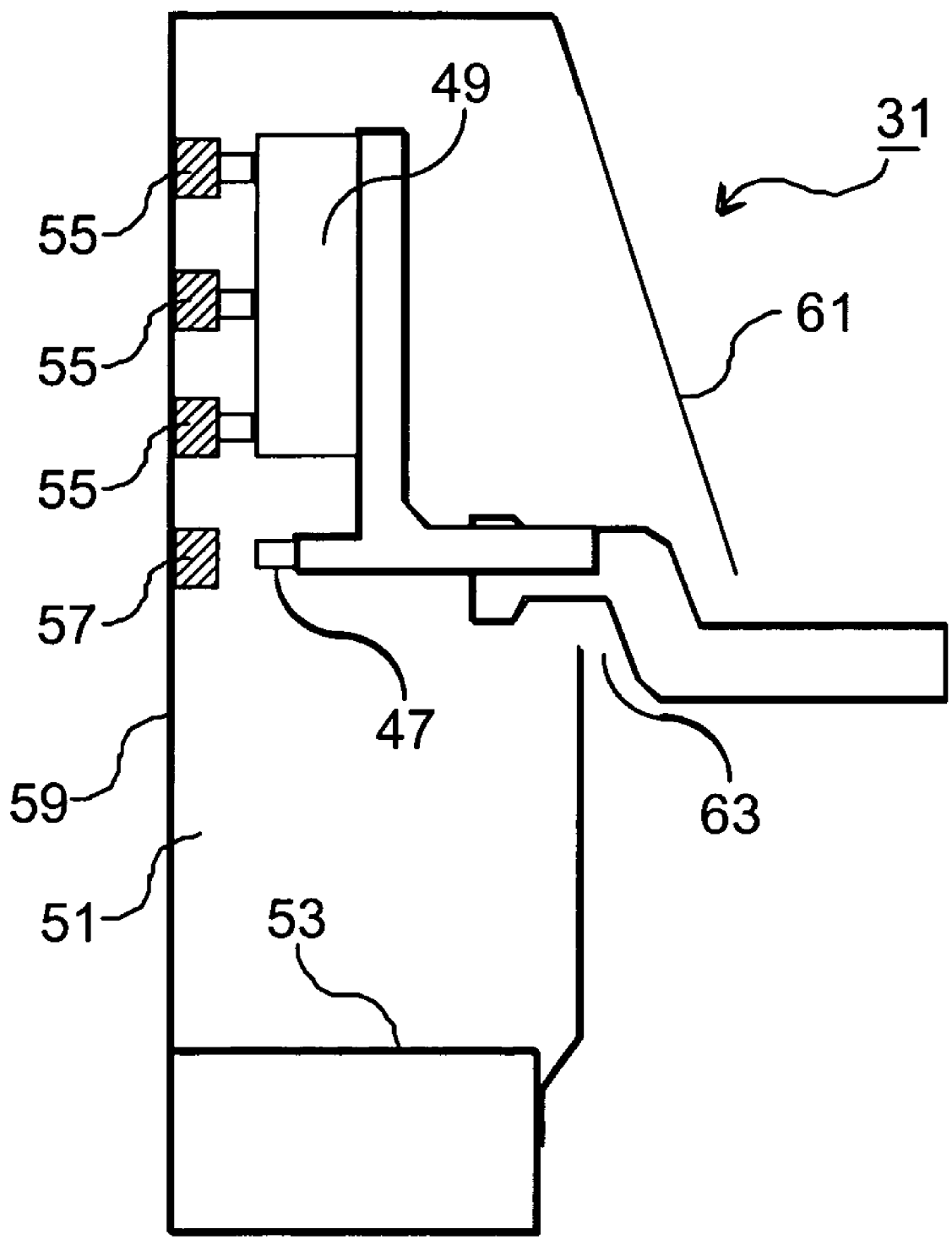
FIG. 5 is a sectional view of one portion of the guideway of FIG. 1, showing the power collector and steering sensor of the lead vehicle of FIG. 1.

Referring to FIG. 5, a vertical sectional view of one guideway channel 51 of guideway 31 is schematically shown. Guideway 31 has two parallel, spaced-apart guideway channels 51, each supporting one front wheel and one rear wheel of each vehicle 13, 17, 19 and 21. Each guideway channel 51 has a base 53 on which one front wheel and one rear wheel rolls. Each guideway channel 51 is an enclosure in this example, having power rails 55 and a steering rail 57 mounted on the interior side of an outer sidewall 59. A separate communications rail (not shown) could be mounted to the interior of outer sidewall 59, also, for passing signals to and from the guideway system and the vehicle. Each guideway channel 51 in this example also has an inner sidewall 61 that has upper and lower portions separated by a horizontally extending slot 63. A portion of each axle 35 and tie rods 39 extend through slot 63.

Vehicle power collectors 49 locate within guideway channel 51 and slidingly engage power rails 55. Power rails 55 are illustrated as providing three phase AC power, but they could alternately provide DC power. Guideway 31 has a controller that also supplies braking, speed and other signals through communication rails or optionally through power rails 55 to vehicles 13, 17, 19 and 21.

Vehicle steering sensors 47 locate within guideway channel 51 also, but protrude laterally less than power collectors 49 so as to be spaced from steering rail 57. Preferably, each steering sensor 47 is a device that will continuously measure the distance between it and steering rail 57 and provide a signal proportional to that distance. In one embodiment, steering sensor 47 is an electromagnetic device, and steering rail 57 is of a magnetic ferrous material, such as mild steel. Steering sensor 47 comprises an electromagnet that provides an electromagnetic field, and the flux of the field varies depending upon the proximity of steering sensor 47 to steering rail 57. Steering sensor 47 monitors the change in electromagnetic flux and provides a signal in proportion to the flux. Preferably, trailing vehicles 17, 19, and 21 (FIG. 1) have similar steering sensors 47.

In the preferred embodiment, both the right and left guideway channels 51 have power rails 55 and a steering rail 57. However, only the right or the left is utilized at any particular moment. For example, at branches or junctions of guideway 31, power and steering controls may pass from the right guideway channel 51 to the left guideway channel 51.

Figure 6:
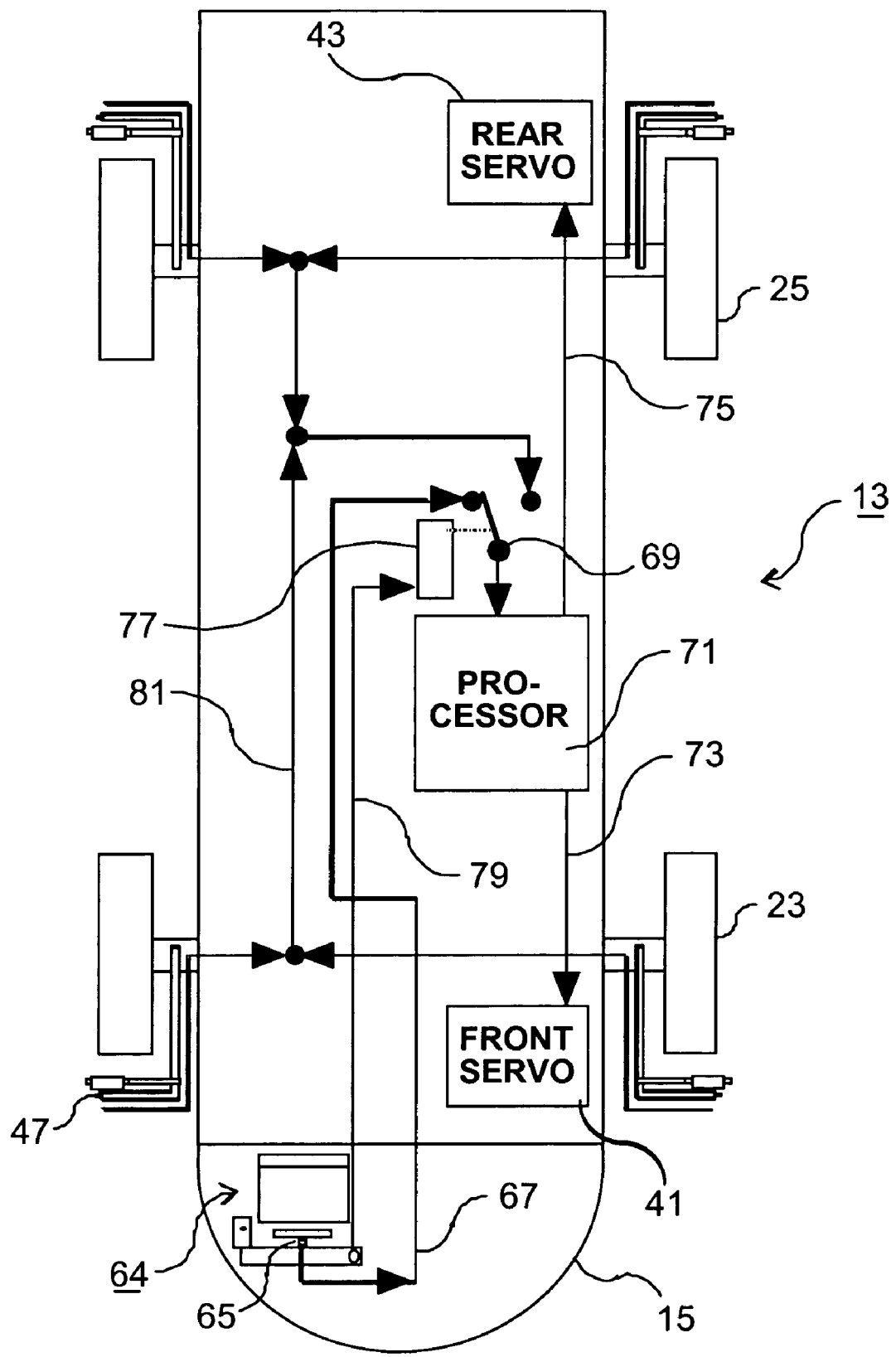
FIG. 6 is a schematic plan view of the lead vehicle of FIG. 1, showing the steering controls for the front and rear wheels and showing the vehicle in a conventional roadway mode.
Figure 7:
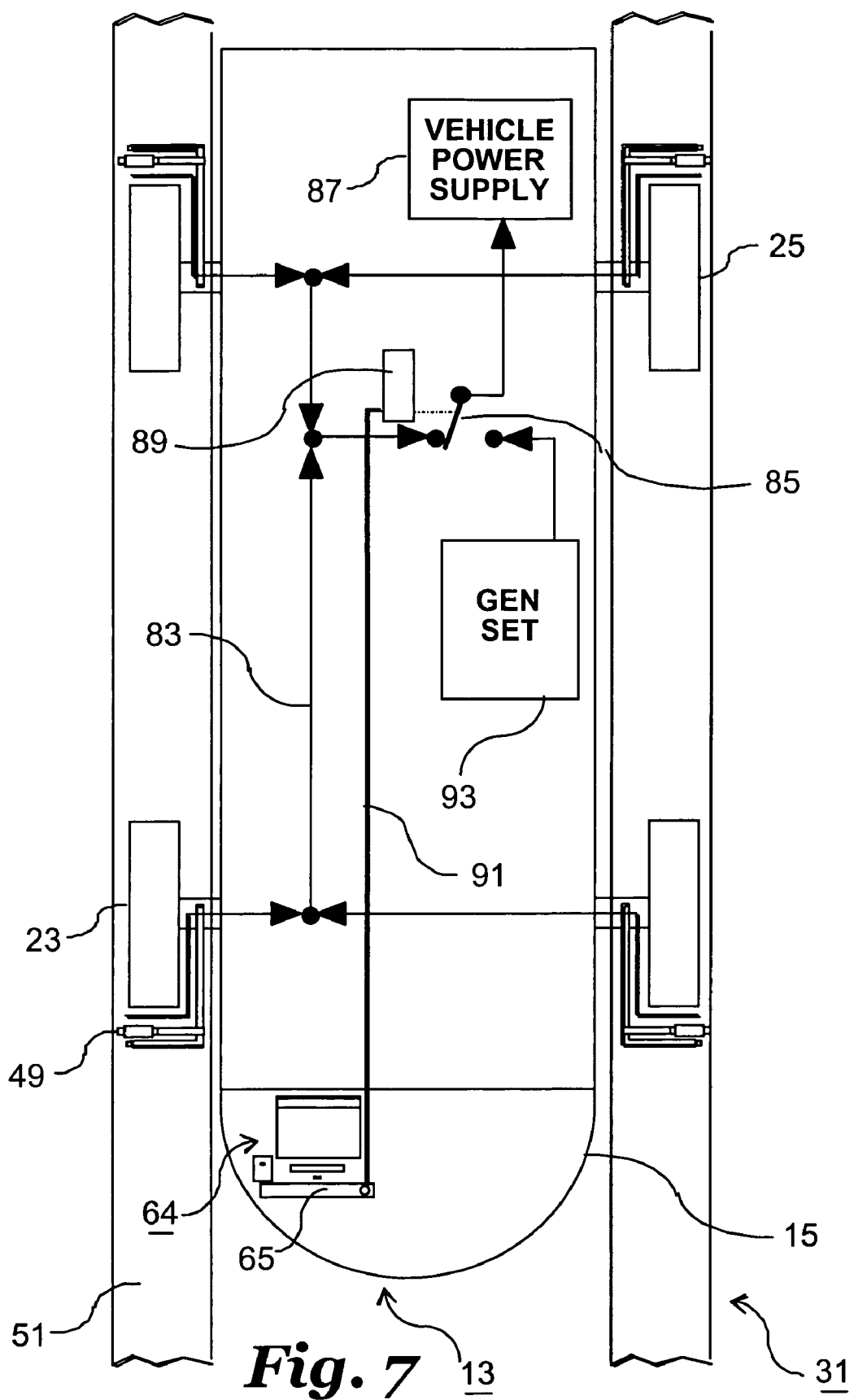
FIG. 7 is a schematic plan view of the lead vehicle of FIG. 1, showing the electrical power components, and showing the vehicle in a guideway mode.

Referring to FIG. 6, lead vehicle 13 has an operator console 64 to be occupied by a driver while on or not on guideway 31 (FIG. 7). Operator console 64 has a manual steering controller 65 that may be a steering wheel or joystick. Manual steering controller 65 is not mechanically connected to either tie rod 39. Rather, manual steering controller 65 is controlled by the operator and connected by an electrical line 67 through a steering relay switch 69 to a processor 71 while not on guideway 31. Processor 71 is a computer controller that is connected by electrical lines 73 and 75 to front servo 41 and rear servo 43, respectively. In this manner, a steering command made by moving manual steering controller 65 causes processor 71 to provide appropriate steering signals to front and rear servos 41, 43.

A switch actuator 77 moves steering switch 69 from the position shown in FIG. 6 to the opposite pole position. Switch actuator 77 is controlled by an electrical line 79 leading to operator console 64. When switch 69 us in the opposite pole position, manual steering controller 65 is disabled, and processor 71 receives signals via the lines 81 from steering sensors 47. Consequently, when lead vehicle 13 is located on guideway 31, switch 69 would be in the opposite pole position, connecting lines 81 to processor 71. Preferably, trailing vehicles 17, 19 (FIG. 1) have the same automatic steering features, except they would not have an operator console 64.

FIG. 7 illustrates the electrical power distribution for lead vehicle 13. Lead vehicle 13 has electrical conductor lines 83 for supplying power from power collectors 49. Power lines 83 lead to a power relay switch 85 that has two positions. In the position shown, power switch 85 is connected to a power supply 87. Power supply 87 receives power from power rail 55 (FIG. 5) when relay switch 85 is in the mode shown in FIG. 7 and provides the power requirements for lead vehicle 13. These power requirements include driving electrical motors 45 (FIG. 3) of each wheel 23, 25 as well as supplying appropriate power for processor 71 and front and rear servos 41, 43 (FIG. 6).

A power switch actuator 89 is controlled from the operator console 64 via a line 91. When the operator actuates actuator 89 to the opposite position, power switch 85 will move to the opposite pole, which connects it to an onboard power source 93. Preferably onboard power source 93 comprises a generator or genset, which typically includes an internal combustion engine that drives a generator. When in the opposite pole position, genset 93 provides the electrical power to power supply 87 rather than power collectors 49. Although onboard power source 93 is shown on lead vehicle 13, it is possible that lead vehicle 13 would not have an onboard power source, rather that onboard power sources 93 would be located on one or more of the trailing vehicles 17, 19 and 21. Alternately, all of the vehicles 13, 17, 19 and 21 could have an onboard power source.

Figure 8:
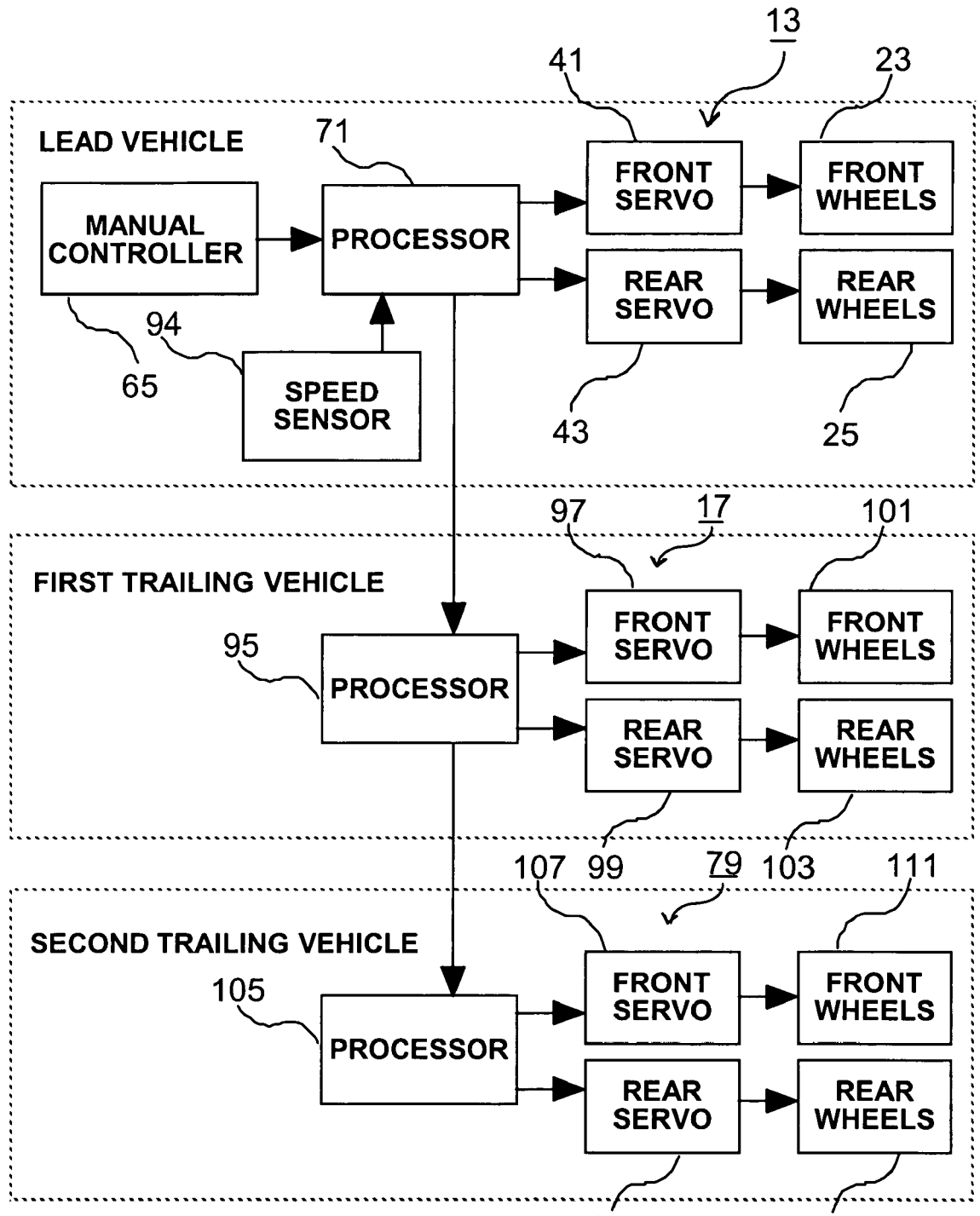
FIG. 8 is a block diagram of the lead vehicle and the first and second trailing vehicles of FIG. 1 as they would appear in a conventional roadway mode.

Referring to FIG. 8, a speed sensor 94 that may be a variety of types provides information to processor 71 of the speed of lead vehicle 13. First trailing vehicle 17 has a processor 95 that is linked to a front servo 97 for controlling front wheels 101. First trailing car processor 95 also is linked to a rear servo 99 for controlling rear wheels 103. Processor 95 communicates with processor 71 of lead vehicle 13. Second trailing vehicle 19 has a processor 105 that communicates processor 95 of first trailing vehicle 17. Second trailing car processor 105 controls a front servo 107, which in turn controls the steering of front wheels 111. Second trailing car processor 105 is also linked to a rear servo 109, which controls the steering of rear wheels 113.

While in a conventional roadway mode, lead vehicle 13 will be powered by onboard power source or genset 93 (FIG. 7). The operator controls speed, braking and steering while in the conventional roadway mode. Referring still to FIG. 8, the operator steers lead vehicle 13 with manual controller 65 while on conventional roadways, which provides steering signals to processor 71. Processor 71 provides signals to front servo 41, which in response steers front wheels 23. Processor 71 stores the steering history of the signals supplied to front servo 41 to compute a path that front wheels 23 have made. In the preferred embodiment, front wheels 23 steer in unison, rather than independently. Consequently on a turn, one front wheel 23 will be turning at a smaller radius than the other front wheel. Processor 71 computes the additional distance that the outside front wheel must roll during a turn and speeds up the motor 45 (FIG. 3) that drives the outside wheel, relative to the motor 45 driving the inside front wheel 23. Processor 71 records the steering history of front wheels 23 along with the vehicle speed, which is provided by speed sensor 94.

After providing steering signals to front servo 41, processor 71 will also provide steering signals to rear servo 43. Processor 71 determines an approximate steering path made by front wheels 23 and controls rear servo 43 so as to cause rear wheels 25 to follow substantially the same path. Processor 71 determines when to apply certain signals to rear servo 43 based on the distance between front wheels 23 and rear wheels 25 and the vehicle speed sensed by speed sensor 94. For example, if the vehicles making a right turn, processor 71 steers rear wheels 23 in a forward direction until the place is reached at which front wheels 23 commenced the turn. Because the rear end of the body of lead vehicle 13 will swing to the left during the right turn, rear wheels 25 appear to be steered to the left, relative to the body of the vehicle, as the turn is occurring, as can be seen by comparing FIGS. 9 and 10. Actually, however, rear wheels 25 remain traveling straight along the roadway until the approximate point where front wheels 23 began the turn. Processor 71 will speed up the outside rear wheel 25 relative to the inside rear wheel 25 at the turn to accommodate for the different distance traveled.

Processor 71 also provides the steering history to processor 95 of first trailing vehicle 17. Processor 95 computes the steering path created by the rear wheels 25 of lead vehicle 13 and controls front servo 97 in the same manner as processor 71 of lead vehicle 13. Processor 95 will record the steering history for its front servo 97 and utilizes that information to control its rear servo 99.

Similarly, processor 95 provides steering history information to processor 105 of second trailing vehicle 19. Processor 105 controls its front servo 107 in the same manner as processor 95. Processor 105 will also calculate the steering path of rear wheels 103 of first trailing vehicle 17 and based on the speed from speed sensor 94, will determine the distance to the particular point and the turn angle at which rear wheels 103 of first trailing vehicle 17 began to turn. Processor 105 determines the steering path of its front wheels 111, and based upon the vehicle speed and the distance from front wheels 111 to rear wheels 113, and steers rear wheels 113 accordingly.

When tram 11 is to be operated on guideway 31, the guideway will supply electrical power and automatically control at least the steering. Optionally, guideway 31 will also provide signals to control braking and speed, or the operator may manually control braking and speed. If so, signals for controlling speed, braking, switching and the like may be transmitted through power collectors 49 or alternatively through contact with a separate communications rail or via radio frequency from the communications rail. Whether supplied by the operator or by guideway 31, preferably the braking and speed control signals are transmitted first to processor 71 of lead vehicle 13, which relays those signals to processor 95 of first trailing vehicle 17. Processor 95 relays the speed and braking signals to the processor of the second trailing vehicle and so on.

Referring to FIG. 6, while on guideway 31, the operator sends a signal from driver console 64 to switch actuator 77, which switches switch 69 to the opposite pole position. This function disables manual steering controller 65. Steering sensor 47 will be located in close proximity to steering guide rail 57 (FIG. 5). Steering sensors 47 compute the distance to steering rail 57 based upon the magnetic flux, and provide signals to the processor 71 (FIG. 6) accordingly. Processor 71 controls front and rear servos 41, 43 to steer front and rear wheels 23, 25.

Trailing vehicles 17, 19 are steered by steering guide rail 57 in the same manner as lead vehicle 13 and independent of lead vehicle 13. Each trailing vehicle 17, 19 has steering sensors 47 that provide signals to their processors 95, 105 (FIG. 8).

When operated on a guideway 31, as shown in FIG. 7, lead vehicle 13 will also place switch 85 in the position shown and turn off genset 93, whether genset 93 is located on lead vehicle 13 or one or more of the trailing vehicles. Power collectors 49 engage power rails 55 (FIG. 5) to supply power to power supply 87 (FIG. 7), which in turn drives the electrical motors 45 (FIG. 3) of each front and rear wheel 23, 25. As mentioned, trailing vehicles 17 and 19 may be separately powered through guideway 31 in the same manner as lead vehicle 13. Alternatively, a power cable could extend through or alongside coupling links 29 (FIG. 4).

The invention has significant advantages. The tram may operate on a guideway without a driver while being powered and controlled by the guideway system. While on the guideway, power is supplied by the guideway and steering is accomplished by proximity steering sensors that are located adjacent steering rails mounted to the guideway. The tram can be driven on conventional roadway, even with multiple trailers, using manual steering and onboard power. Because of the independent steering of the front and rear wheels, the tram can maneuver through sharp turns. The coupling links enable the opposed ends of the vehicles to shift relative to each other.

While the invention has been shown in only one of its forms, it should be apparent to those skilled in the art that it is not so limited but is susceptible to various changes without departing from the scope of the invention.

I claim:

1. A transport system, comprising:
   a guideway having a steering rail extending lengthwise along the guideway;
   at least one vehicle having front and rear wheels in the guideway for movement along the guideway;
   a front steering servo for the front wheels of the vehicles;
   a processor on the vehicle;
   a steering rail sensor mounted to the vehicle, alongside and spaced out of contact with the steering rail, the sensor sensing a distance from the sensor to the steering rail of the guideway, and providing signals in response thereto to the processor; and
   wherein the processor provides signals to the front steering servo to steer the vehicle to maintain a selected distance between the sensor and the steering rail of the guideway.

2. The system according to claim 1, wherein:
   the steering rail is of a magnetic ferrous material,
   the sensor comprises an electromagnet that provides an electromagnetic field having a magnetic flux that is affected by proximity of the sensor to the steering rail, and the sensor monitors a change in the magnetic flux to determine the distance from the sensor to the steering rail.

3. The system according to claim 2, wherein:
   the guideway comprises two parallel, spaced-apart guideway channels, each supporting one of the front wheels and one of the rear wheels and each having an outer sidewall;
   the steering rail is mounted along an interior side of the outer sidewall; and
   the sensor directs the magnetic field laterally outward from the vehicle.

4. The system according to claim 1, further comprising:
   a manual steering controller on the vehicle for operation by a driver while not on the guideway, the steering controller providing steering command signals to the processor, which in turn provides signals to the steering servo to steer the vehicle on a conventional roadway.

5. The system according to claim 4, further comprising:
   a manually controllable switch that disables the manual steering controller while the vehicle is on the guideway.

6. The system according to claim 1, further comprising:
   at least one electrical motor for driving at least one of the wheels;
   art electrical power conductor rail on the guideway;
   a power collector mounted to the vehicle for engaging the power conductor rail as the vehicle moves along the guideway to supply power to the motor;
   an onboard power source on the vehicle for powering the motor while the vehicle is not on the guideway; and
   a manually controllable switch for switching the supply of power to the motor between the power collector and the onboard power source.

7. The system according to claim 1, wherein the functions of speed and braking of the vehicle may be performed manually by the operator while both on or off the guideway.

8. The system according to claim 1, wherein while the vehicle is o the guideway, the guideway provides signals to the processor to perform speed and braking control.

9. A transport system, comprising:
   a lead and at least one trailing vehicle, each having front wheels and rear wheels, the trailing vehicle being coupled to the lead vehicle;
   a front steering servo for the front wheels of each of the vehicles and a rear steering servo for the rear wheels of each of the vehicles;
   lead and trailing processors on the lead and trailing vehicles, respectively, for steering the vehicles;
   a manual steering controller on the lead vehicle for operation by a driver to provide steering command signals to the lead processor to steer along a selected path on a conventional roadway; wherein the lead processor, in response to receipt of a steering command signal, provides servo signals to the front and rear steering servos of the lead vehicle to steer the front and rear wheels of the lead vehicle along the selected path, and provides a steering history signal to the trailing processor indicative of the selected path; and the trailing processor, in response, to receipt of the steering history signal from the lead processor, provides servo signals to the front and rear steering servos of the trailing vehicle to steer along the selected path.

10. The system according to claim 9, wherein:

the lead processor stores a steering history of the steering servo signals provided to the front steering servo of the lead vehicle, and based upon a speed of the lead vehicle and the distance between the front and rear wheels of toe lead vehicle, provides servo signals to the rear steering servo of the lead vehicle.

11. The system according to claim 9, wherein the lead processor stores and provides a steering history of the rear steering servo of the lead vehicle to the trailing processor, which based upon a speed of the trailing vehicle and the distance between the rear wheels of the lead vehicle and the front wheels of the trailing vehicle, provides servo signals to the front steering servo of the trading vehicle.

12. The system according to claim 9, the trailing, processor stores a steering history of the steering servo signals provided to the front steering servo of the trailing vehicle, and based upon a speed of the trailing vehicle and the distance between the front and rear wheels of the trailing vehicle, provides servo signals to the rear steering servo of the trailing vehicle.

13. The system according to claim 9, further comprising:

a guideway upon which the vehicles traverse, the guideway having a steering rail;

steering rail sensors mounted to each of the lead and trailing vehicles for sensing a distance limn each of the sensors to the steering rail and for providing signals in response thereto to the processors, the processors in turn providing signals to the front and rear servos of the vehicles for maintaining a selected distance between the sensors and the steering rail; and a switch that disables the manual steering controller while the vehicles are on the guideway.

14. A transport system, comprising:

a guideway having a power conductor rail and a steering rail;

a lead and a trailing vehicle for movement both along the guideway and on conventional roadways, each of the vehicles having front wheels and roar wheels, the front, wheels and the rear wheels each the being steerable, the trailing vehicle being coupled to the lead vehicle;

front and rear steering servos for the front and rear wheels, respectively, of each of the vehicles;

a processor on each of the vehicles;

a manual steering controller on the lead vehicle for manual operation by a driver while on a conventional roadway to provide steering; command signals to the processor of the lead vehicle; wherein in response to receipt of a steering command signal, the processor of the lead vehicle provides servo signals to the steering servos of the lead vehicle to steer the wheels of the lead vehicle, and the processor of the lead vehicle provides a steering history signal to the processor of the trailing vehicle;

in response to receipt of a steering history signal, the processor of the trailing vehicle provides servo signals to the steering servos of the trailing vehicle to steer the wheels of the trailing vehicle;

steeling rail sensors mounted to the vehicles for sensing a distance from the sensors to the steering rail while the vehicles are on the guideway and for providing signals to the processors;

the processors provide servo signals to the steering servos to automatically steer each of the vehicles along the guideway; and a switch that disables the manual steering controller while the vehicles are on the guideway.

15. The tram according to claim 14, further comprising:

a power conductor ran on the guideway;

an electrical motor on at least one of the vehicles for propelling the vehicles;

a power collector mounted to said at least one of the vehicles for contact with the power conductor rail for supplying electrical power to the motor while the vehicles are on the guideway; and an onboard power source on at least one of the vehicles for supplying electrical power to the motor while the vehicles are on a conventional roadway.

16. A transport system, comprising:

a guideway having a steering rail extending lengthwise along the guideway, the steering rail being formed of a ferrous material;

a vehicle for movement along the guideway;

a steering servo for the vehicle;

a processor on the vehicle;

a steering rail sensor mounted to the vehicle, alongside and spaced out of contact with the steering rail, the sensor generating a magnetic field that is affected by a distance from the sensor to the steering rail of the guideway, and the sensor providing a voltage that varies in response to changes in the magnetic field, the voltage being applied to the processor; and wherein the processor provides signals to the steering servo to steer the vehicle to maintain a selected distance between the sensor and the steering rail of the guideway.

* * * * *